United States Patent
Trivedi et al.

(10) Patent No.: US 9,263,885 B2
(45) Date of Patent: Feb. 16, 2016

(54) DISTRIBUTED POWER DELIVERY SCHEME FOR ON-DIE VOLTAGE SCALING

(71) Applicant: Intel Corporation, Santa Clara, CA (US)

(72) Inventors: Malay Trivedi, Chandler, AZ (US); Tong H. Kim, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 13/892,788

(22) Filed: May 13, 2013

(65) Prior Publication Data

US 2013/0318387 A1 Nov. 28, 2013

Related U.S. Application Data (63) Continuation of application No. 12/824,134, filed on Jun. 25, 2010, now Pat. No. 8,441,149.

(51) Int. Cl.
*H02J 1/00* (2006.01)
*G06F 1/26* (2006.01)
*G06F 1/32* (2006.01)

(52) U.S. Cl.
CPC ... *H02J 1/00* (2013.01); *G06F 1/26* (2013.01); *G06F 1/3203* (2013.01); *G06F 1/324* (2013.01); *G06F 1/3287* (2013.01); *G06F 1/3296* (2013.01); *Y02B 60/1217* (2013.01); *Y02B 60/1282* (2013.01); *Y02B 60/1285* (2013.01); *Y10T 307/406* (2015.04); *Y10T 307/944* (2015.04)

(58) Field of Classification Search
CPC ............ H02J 1/00; G06F 1/26; G06F 1/3203; G06F 1/324; G06F 1/3287; G06F 1/3296; Y10T 307/406; Y10T 307/944; Y02B 60/1217; Y02B 60/1281; Y02B 60/1285
USPC .......................................................... 307/31
See application file for complete search history.

(56) References Cited

U.S. PATENT DOCUMENTS

| | | |
|---|---|---|
| 2003/0085148 A1 | 5/2003 | Boehm et al. |
| 2003/0085418 A1 | 5/2003 | Hazucha et al. |
| 2003/0168915 A1 | 9/2003 | Zhang et al. |

(Continued)

FOREIGN PATENT DOCUMENTS

| | | |
|---|---|---|
| JP | 2004-114319 A | 4/2004 |
| JP | 2008-172230 A | 7/2008 |

(Continued)

OTHER PUBLICATIONS

Taiwan Office Action for Application No. 100117393 dated Jan. 24, 2014, 8 pages.

(Continued)

*Primary Examiner* — Hal Kaplan
(74) *Attorney, Agent, or Firm* — Schwabe, Williamson & Wyatt, P.C.

(57) ABSTRACT

A high-speed low dropout (HS-LDO) voltage regulation circuit suitable to enable a power gate unit to produce a variable voltage signal based on the load of a processor is disclosed herein. In various embodiments, selection logic may dynamically enable or disable the HS-LDO circuit to allow the power gate unit to operate under a fully-on or fully-off mode. Other embodiments may be disclosed or claimed.

14 Claims, 6 Drawing Sheets

(56) References Cited

U.S. PATENT DOCUMENTS

| | | |
|---|---|---|
| 2006/0261878 A1 | 11/2006 | Pham |
| 2007/0005995 A1 | 1/2007 | Kardach et al. |
| 2007/0055586 A1 | 3/2007 | Lucas |
| 2007/0055896 A1 | 3/2007 | Er et al. |
| 2008/0001655 A1 | 1/2008 | Pham et al. |
| 2008/0111534 A1 | 5/2008 | Ravichandran |
| 2008/0180157 A1 | 7/2008 | Choi et al. |
| 2008/0238390 A1 | 10/2008 | Trivedi et al. |
| 2009/0140768 A1 | 6/2009 | Luich |
| 2009/0158073 A1 | 6/2009 | Hsieh et al. |
| 2009/0170768 A1 | 7/2009 | Tour et al. |
| 2010/0033236 A1 | 2/2010 | Triantafillou et al. |
| 2010/0308654 A1 | 12/2010 | Chen |

FOREIGN PATENT DOCUMENTS

| | | |
|---|---|---|
| JP | 2009-123235 A | 6/2009 |
| TW | 535049 B | 6/2003 |

OTHER PUBLICATIONS

Hazucha et al., "Area-Efficient Linear Regulator With Ultra-Fast Load Regulation," IEEE Journal of Solid-State Circuits, vol. 40, No. 4, pp. 933-940, Apr. 2005.

Royannez et al., "90nm Low Leakage SoC Design Techniques for Wireless Applications," ISSCC 2005, Session 7, Multimedia Processing, 2005 IEEE International Solid-State Circuits Conference, San Francisco, California, Feb. 10, 2005, Digest of Technical Papers, pp. 138-139, 589.

Hattori et al., "A Power Management Scheme Controlling 20 Power Domains for a Single-Chip Mobile Processor," ISSCC 2006, Session 29, Power Management and Distribution, 2006 IEEE International Solid-State Circuits Conference, San Francisco, California, Feb. 6-9, 2006, Digest of Technical Papers, pp. 2210-2219.

Ishibashi et al., "Circuit Technologies for Reducing the Power of SOC and Issues on Transistor Models," IEDM '06, International Electron Devices Meeting, 2006, San Francisco, California, Dec. 11-13, 2006, pp. 1-4.

Hattori et al., "Hierarchical Power Distribution and Power Management Scheme for Single Chip Mobile Processor," 43rd ACM/IEEE Design Automation Conference, 2006, San Francisco, California, Jul. 24-28, 2006, pp. 292-295.

Ueda et al., "A Power, Performance Scalable Eight-Cores Media Processor for Mobile Multimedia Applications," pp. 1-35, powerpoint presentation, downloaded May 2010.

International Search Report and Written Opinion for PCT/US2011/039704, mailed Jan. 18, 2012.

First Office Action for DE 102011102152.7, mailed Jan. 16, 2013.

First Office Action for JP 2011-110610, mailed Oct. 16, 2012.

Office Action and Search Report for CN 201110188562.X, mailed Sep. 4, 2013, 11 pages.

Office Action for CN 201120238932.1, mailed Oct. 12, 2011, 5 pages.

Office Action for KR 10-2012-7033593 dated Dec. 16, 2013, 5 pages.

Restriction Requirement for U.S. Appl. No. 12/824,134, mailed May 23, 2012, 7 pages.

Office Action for U.S. Appl. No. 12/824,134, mailed Jul. 19, 2012, 13 pages.

Notice of Allowability for U.S. Appl. No. 12/824,134, mailed Jan. 17, 2013, 4 pages.

DISTRIBUTED POWER DELIVERY SCHEME FOR ON-DIE VOLTAGE SCALING

CROSS REFERENCE TO RELATED APPLICATION

The present application is a continuation of and claims priority under 35 U.S.C. §120 to U.S. patent application Ser. No. 12/824,134, entitled "DISTRIBUTED POWER DELIVERY SCHEME FOR ON-DIE VOLTAGE SCALING," filed Jun. 25, 2010, assigned to the same assignee as the present application, and incorporated herein by reference in its entirety.

TECHNICAL FIELD

The present disclosure generally relates to integrated circuits, in particular, delivery of variable voltages through an on-die voltage regulator.

BACKGROUND

Computing devices may spend a majority of time in idle states. Therefore, power savings in idle states may be crucial to curb power consumption.

Some processors may allow core voltages to be adjusted depending on the activity. For example, some central processing units (CPUs) may have the capability to generate a voltage identification (VID) signal. The VID signal may indicate to the power supply unit the amount of voltage that is needed by the CPUs. A common way to supply this variable voltage may be through the use of an external voltage regulator (VR). However, an external VR may be more expensive than a fixed voltage regulator and may require bigger physical board area. In addition, an external VR may be slow in adjusting its output. As a result, external VRs may not be well suited to support dynamic power savings of CPUs over small time increments.

There exists today several on-die power saving techniques without using an external VR. These techniques include clock scaling, clock gating and power gating. Clock scaling may refer to scaling the clock frequency in accordance with work load in order to save dynamic active power. Clock gating may refer to maintaining the states of certain logic blocks of the processor when the logic blocks are not processing any data in order to eliminate switching power consumption. Although clock scaling and/or clock gating may reduce dynamic power consumption, an external VR may still be necessary to change the supply voltage in order to reduce the leakage power.

Power gating may refer to turning off power to certain logic blocks of the processor that are not currently in use to reduce the overall power leakage of a processor. Power gating may behave as an on/off control over supply voltages. Ideally, power gated logic blocks may consume no power at all. As such, power gating may be well suited to bring the logic blocks to stand-by or sleep mode. However, due to the inherent latencies associated with entering or exiting power gated states, power gating may not be tolerable under conditions of normal operation.

There is a need to save even greater amount of power, especially in circumstances when one or more power domains of a processor cannot be powered down completely, but are not processing time-sensitive data either. Furthermore, since external VRs may be costly and inefficient, it may be advantageous to have a fine-grained power delivery mechanism on the die that meets the following needs: delivery of variable voltage levels without using an external VR; Vcc tuning based on process corner to meet the product requirements; operating different logic blocks with different clock frequencies at different voltages with a common input voltage; and generating variable voltage levels from a common input voltage in order to reduce the number of platform VR rails.

BRIEF DESCRIPTION OF THE DRAWINGS

Embodiments of the present disclosure will be described by way of exemplary illustrations, but not limitations, shown in the accompanying drawings in which like references denote similar elements, and in which.

DETAILED DESCRIPTION OF ILLUSTRATIVE EMBODIMENTS

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

The description may use various terms such as "operational amplifier," "gate," "transistor," "resistor," "PMOS" and "NMOS" etc. to represent various components used in various embodiments. It is understood that these components may be implemented in various ways and/or be replaced by components of similar functionality. For example, a "resistor" or an "operational amplifier" may be implemented with multiple resistors and/or transistors. Therefore, the terms used throughout this disclosure are for purpose of illustration only, not to be construed as limitations.

A processor of a computing device may have several power domains. Each power domain may have its own phase locked loop (PLL) to control its clock frequency and may manage its own power consumption independently. Power gating, along with clock gating, clock scaling, may reduce power consumption of a processor. Typically, a power gate (PGT) unit may be associated with a logic block within a power domain, and a power domain may contain multiple PGT units. Vendors of Electronic Design Automation (EDA) tools may provide schematics for various standard power gate (PGT) units, also known as PGT cells, in their EDA tools. The PGT units may be mapped to their respective logic blocks automatically through a process called automated placement and route (APR).

A regular PGT unit may support two modes of operation, a fully-on mode where a logic block associated with the PGT unit may operate under normal voltage, and a fully-off mode where the logic block may be completely powered off, i.e., receiving approximately 0 volts from the PGT unit.

According to various embodiments, a high speed low dropout (HS-LDO) voltage regulation circuit may be coupled to the PGT units of a power domain within a processor to provide the PGT units with a third operating mode: variable voltage mode. In this variable voltage mode, the output voltage of the PGT units may change depending upon the actual load of the processor. For example, when a power domain is not processing time-sensitive data but cannot be powered down completely, the processor may output a VID signal indicating to the HS-LDO circuit that a lower voltage is desired in order to save power. Similarly, when the load of the processor increases, the HS-LDO circuit may direct all the PGT units within the power domain to provide a higher voltage to meet the demand of the processor.

In various embodiments, when the HS-LDO circuit is disabled, the PGT units may function under the fully-on or fully-off operational modes, in which the logic blocks associated with the PGT units are either operating normally under full voltage, or powered off, receiving 0 volts from the PGT units. In various embodiments, when the HS-LDO circuit is enabled, the PGT units may function under the variable voltage mode. In the variable voltage mode, the HS-LDO circuit may direct all the PGT units within the power domain to provide an output to their respective logic blocks based on a VID signal, or some other voltage control signal.

In various embodiments, when the HS-LDO circuit is enabled and the PGT units are operating in the variable voltage mode, the logic block associated with the PGT unit may receive a voltage signal that is lower than the fully-on voltage under normal operating conditions. However, the logic blocks may still be kept in active operation, as opposed to standby or sleep states where the logic blocks merely retaining their state information but do not actively process any information. Therefore, the HS-LDO circuit may not have the entry-exit latencies associated with some other power saving approaches.

Figure 1:
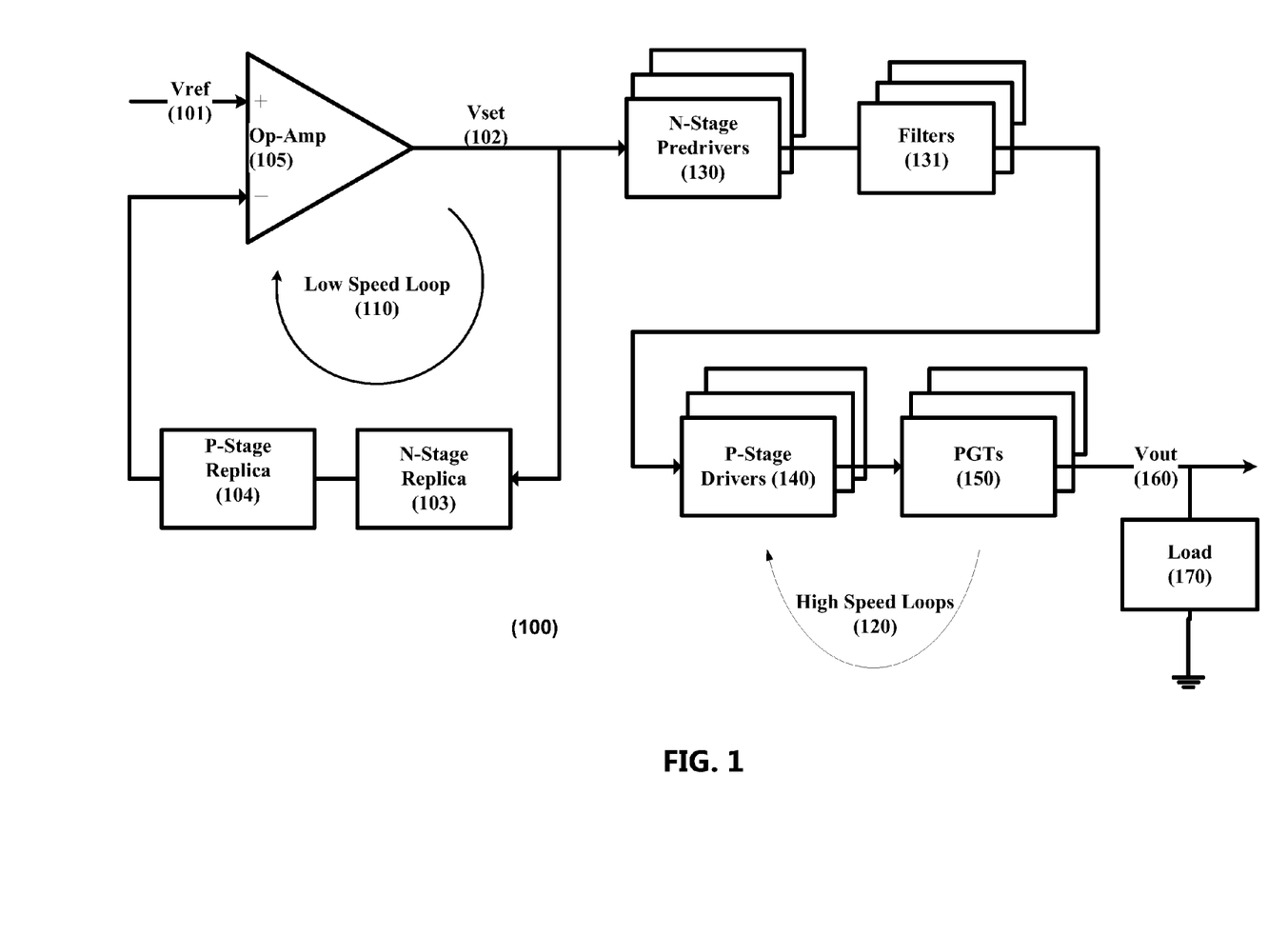
FIG. 1 is a block diagram of an example high speed low dropout (HS-LDO) voltage regulation circuit in accordance with various embodiments.

FIG. 1 is a block diagram of an example HS-LDO voltage regulation circuit in accordance with various embodiments. In embodiments, as illustrated, a HS-LDO circuit 100 may include a centralized low speed loop (LSL) 110 and various other components.

In various embodiments, the centralized LSL 110 may include an operational amplifier (op-amp) 105. The op-amp 105 may receive a reference voltage, Vref 101, at one of its input terminals. The op-amp 105 may generate a set point voltage signal, Vset 102, at its output terminal. The output terminal of the op-amp 105 may be further coupled to a second input terminal of the op-amp 105 via one or more components, which may include a N-Stage replica 103 and a P-Stage replica 104. The coupling between the output terminal and the second input terminal of the op-amp 105 may form a feedback loop. The op-amp 105 may produce the output Vset 102 that is about equal to the input Vref 101, similar to a unity gain buffer amplifier. The details of the N-Stage replica 103 and the P-Stage replica 104 will be provided in later sections of this disclosure.

In various embodiments, the Vref 101 may be generated by an external reference voltage generator or by a component of the HS-LDO circuit 100 that is not shown in FIG. 1. The reference voltage may be generated by a bandgap reference generator, a resistor ladder, or some other known devices. The Vref 101 may be generated dynamically based on a VID signal of the processor, or based on some other voltage control signal.

In various embodiments, the op-amp 105 may include an operational transconductance amplifier (OTA). Using an OTA in the HS-LDO circuit 100 may provide bigger space savings and better stability for the HS-LDO circuit 100. In various embodiments, the op-amp 105 may include additional input/output terminals that are not shown in FIG. 1.

In various embodiments, the HS-LDO circuit 100 may further include multiple N-Stage predriver units 130 and multiple P-Stage driver units 140 for delivery the Vset 102 to multiple PGT units 150. The details of the N-Stage predriver units 130 and the P-Stage driver units 140 will be provided in later sections of this disclosure.

Figure 2:
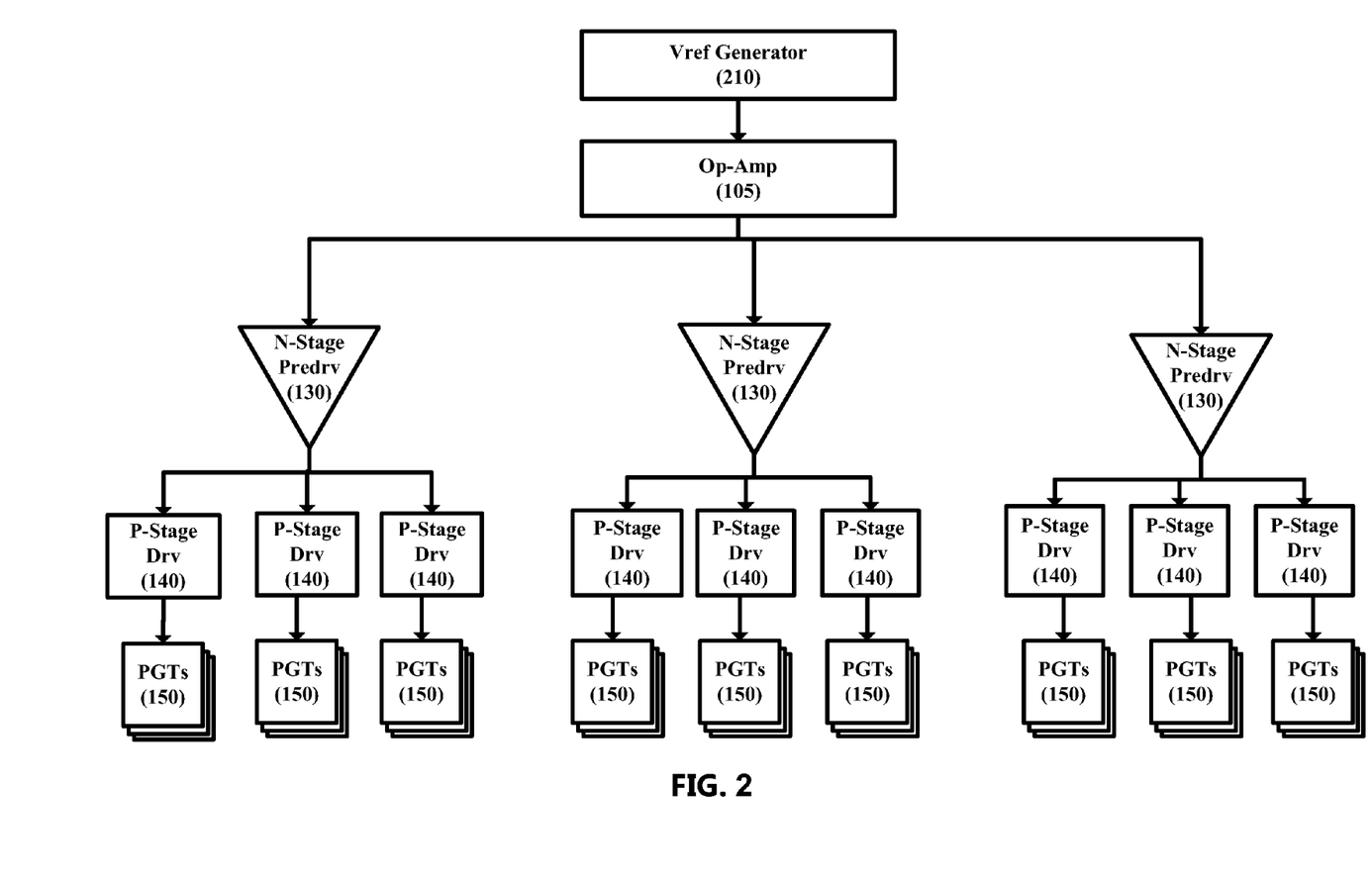
FIG. 2 is a block diagram illustrating the structural relationship among various components of the HS-LDO circuit, in accordance with various embodiments.

FIG. 2 is a block diagram illustrating the structural relationship among various components of the HS-LDO circuit 100, in accordance with various embodiments. In various embodiments, as illustrated, a voltage reference generator 210 may generate the Vref 101. The Vref 101 may be provided to the op-amp 105. The output terminal of the op-amp 105 may be coupled to multiple N-Stage predriver units 130. Each N-Stage predriver unit 130 may be coupled to multiple P-Stage driver units 140. Each P-Stage amplifier 140 may be further coupled to multiple PGT units 150. The HS-LDO circuit 100 may have a tree-like structure, with each stage of components successively fanning out from the op-amp 105. This structure may help separate and isolate the LSL 110 from the remaining parts of the HS-LDO circuit 100, and may ensure that the variations in the remaining parts of the HS-LDO circuit 100, including the transient changes to load 170 of the PGT units 150, do not destabilize of the LSL 110 and the Vset 102. In addition, with the tree-like structure, more PGT units 150 may be coupled to the LSL 110, improving the scalability of the HS-LDO circuit 100.

Referring back to FIG. 1, as illustrated, in various embodiments, each PGT unit 150 may provide the Vout 160, to a logic block that is associated with the PGT unit. The logic block is illustrated in FIG. 1 as the load 170. In various embodiments, each PGT unit 150 and its associated P-Stage driver unit 140 may form a high speed loop (HSL) 120. More details of the HSL 120 will be provided in later sections of this disclosure. Even though a conventional low dropout (LDO) voltage regulator circuit may also deliver variable voltages to the load 170, decoupling the HSL 120 from the LSL 110 may help the HS-LDO circuit 100 to sustain the fast current/voltage transient steps of the load 170 within a specified tolerance band. In addition, conventional LDO circuit may require larger amount of on-die capacitance due to its compensation requirement.

In various embodiments, the HS-LDO circuit 100 may also include various filters 131 placed in between and coupled to the N-Stage predriver units 130 and the P-Stage driver units 140. The filters 131 may further isolate the LSL 110 from the remaining parts of the HS-LDO circuit 100. For example, in various embodiments, the Vset 102 may be a low frequency signal. Therefore, the filters 131 may be used to cut off any frequency including the package resonance frequency, typically around 300 MHz, to eliminate any package parasitic noise. The filters 131 may also prevent feedback of noise glitches experienced at the output stage due to unpredictable variations at the load 170. In various embodiments, the filters 131 may include RC filters and/or AC compensators.

Figure 3:
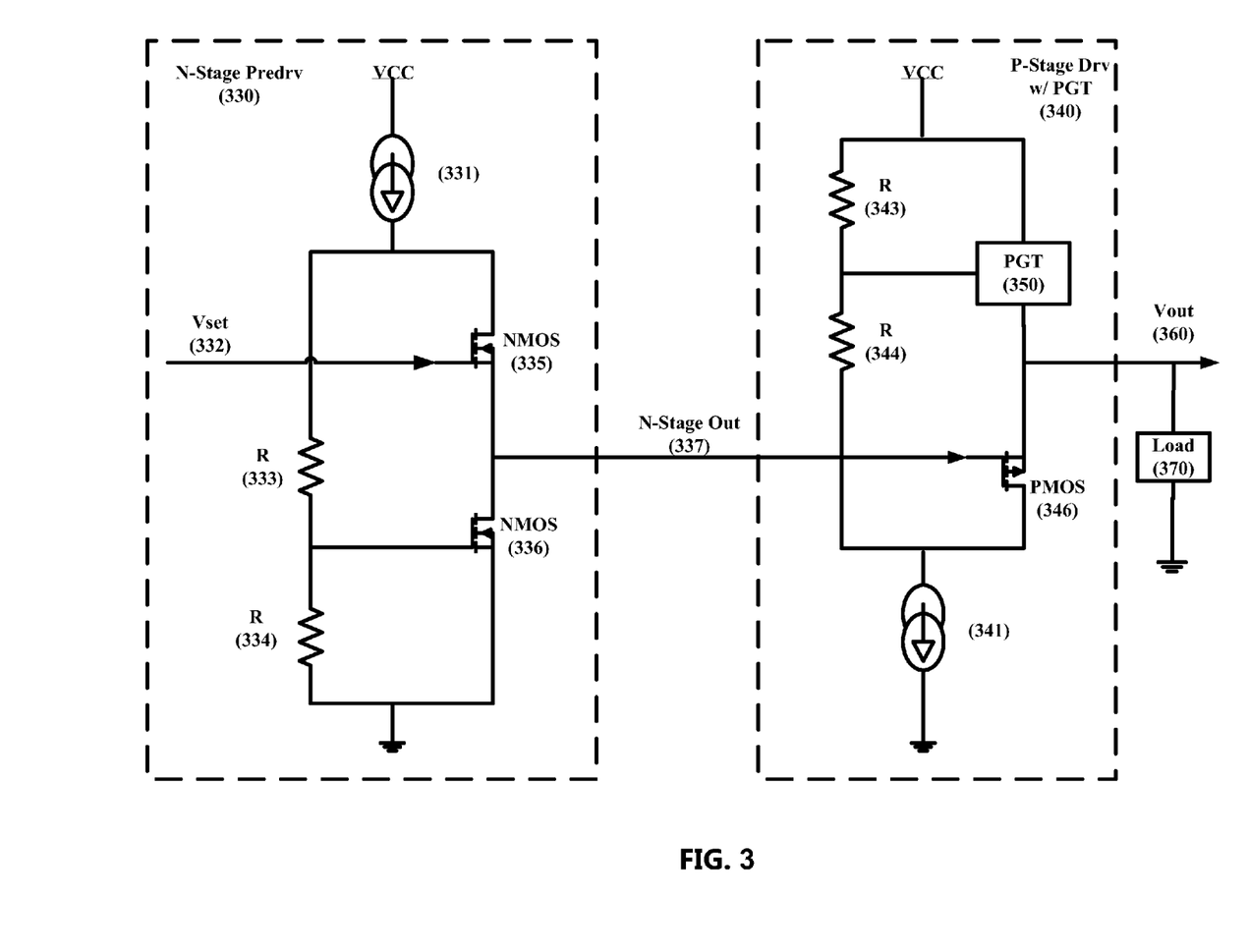
FIG. 3 is a block diagram of an example N-Stage predriver unit and an example P-Stage driver unit coupled to a PGT unit in accordance with various embodiments.

FIG. 3 is a block diagram of an example N-Stage predriver unit and an example P-Stage driver unit coupled to a PGT unit in accordance with various embodiments. As illustrated, in various embodiments, a N-Stage predriver unit 330 may include a current source 331, a first bias resistor 333, a second bias resistor 334, a first N-type transistor 335, and a second N-type transistor 336. Both the N-type transistors 335 and 336 may be N-type MOSFETs, or NMOSes. As illustrated, a signal Vset 332 may represent the set point voltage signal generated by the op-amp 105 in FIG. 1, which may be about equal to the Vref 101. In various embodiments, the Vset 332 may be coupled to the gate terminal of the N-type transistor 335 and may serve as the DC bias set point for the N-Stage predriver unit 330. In various embodiments, the N-type transistor 335 may function in similar way to a common gate amplifier, as the Vset 332 signal may be the AC ground. In various embodiments, during steady state operations, the N-Stage predriver unit 330 may produce an output 337 that is about equal to the Vset 332 minus a threshold voltage, Vth, of the N-type transistor 335. In various embodiments, the resistors 333 and 334 may be accordingly chosen to set the bias voltage so that the output 337 of the N-Stage predriver unit may be generated.

In various embodiments, a P-Stage driver unit coupled to a PGT unit 340 may include a current sink 341, a first bias resistor 343, a second bias resistor 344, a first P-type transistor 346, and a PGT unit 350. The P-type transistor 346 may be a P-type MOSFET, or a PMOS. As illustrated, the output 337 of the corresponding N-Stage predriver unit may be coupled to the gate terminal of the P-type transistor 346 and serve as DC bias set point for the PGT unit 350. In various embodiments, the P-type transistor 346 may function in similar way to a common gate amplifier, as the output 337 of the N-Stage predriver 330 may be the AC ground. The PGT unit 350 may provide a Vout 360 to a load 370. In various embodiments, the resistors 343 and 344 may be accordingly chosen to set the bias voltage so that the PGT 350 may be operating and delivering a DC current to the load 370.

In various embodiments, during steady state operations, the PGT unit 350 may produce the Vout 360 that is about equal to the output 337 of the N-Stage predriver unit plus a threshold voltage, Vth, of the P-type transistor 346. As previously described, the N-Stage predriver unit 330 may shift the Vset 332 down by the Vth of the N-type transistor 335, and the P-Stage driver unit coupled to a PGT unit 340 may shift the output 337 of the N-Stage predriver unit up by the Vth of P-type transistor 346. Consequently, the PGT unit 350 may produce the Vout 360 that is about equal to the Vset 332, and subsequently about equal to the Vref 101, as long as the Vth of the N-type transistor 335 is chosen to be about the same as the Vth of the P-type transistor 346. In various embodiments, matching the Vth of the N-type transistor 335 and the P-type transistor 346 may help maintain the full operating range of the HS-LDO circuit 100.

In various embodiments, the threshold voltage of the N-type and P-type transistors may be around 350 mV. In various embodiments, the Vout 360 may operate in a range between 350 mV to 970 mV, or any voltage as indicated by a voltage control signal, such as a VID signal.

In various embodiments, the PGT unit 350 with the associated P-Stage driver unit may form the HSL 120. When the load 370 to the PGT unit 350 spikes sharply within a short time frame, e.g., within 1 ns, this may cause a sudden voltage drop to the Vout 360. This sudden voltage change may be referred to as an AC voltage droop. The P-type transistor 346 may detect this droop, and may cause the current on the resistors 343 and 344 to increase, thereby increasing the voltage across the gate and the source terminals of the PGT unit 350, which may in turn output higher current to compensate for the voltage droop. Similarly, when the load 370 to the PGT unit 350 reduces sharply within a short time frame, this may cause a spike in Vout 360. The P-type transistor 346 may detect this droop, and may cause the current on the resistors 343 and 344 to decrease, thereby decreasing the voltage between the gate and the source terminals of the PGT unit 350, which may in turn lower the output current to compensate for the voltage droop. In various embodiments, decoupling the HSL 120 from the LSL 110 may improve the stability of the HS-LDO circuit 100.

Even though FIG. 3 only illustrates a single N-Stage predriver unit and a single P-Stage driver unit coupled to a PGT unit, in various embodiments, a single N-Stage predriver unit 330 may be coupled to hundreds of the P-Stage driver units. Similarly, a single P-Stage driver unit may be coupled to hundreds of the PGT units 350. Each PGT unit 350 may be coupled to its own P-type transistor 346. However, the PGT units 350 that are coupled to the same P-Stage driver unit may share the biasing resistors 343 and 344. This may reduce the complexity and space requirements of the HS-LDO circuit 100 as no individual biasing circuit is necessary for each PGT unit 350.

In various embodiments, the current source 331 and the current sink 341 may be chosen based on the resistors 333, 334, 343 and 344, and the desired bandwidth of the HSL 120. The resistors 333, 334, and the resistors 343, 344 may or may not be identical. In various embodiments, the N-type transistors 335 and 336 may or may not be structurally identical. In various embodiments, the N-type transistors 335 and 336 may or may not have the same physical dimension with the P-type transistor 346.

Referring back to FIG. 1 again, in various embodiments, the N-Stage replica 103 may be a replica of all the N-Stage predriver units 330, and the P-Stage replica 104 may be a replica of all the P-Stage driver units, without the PGT units 350 and the load 370. The replicas 103 and 104 in the LSL 110 may further improve the accuracy of the feedback loop to the op-amp 105. In various embodiments, when the load 370 does not require precise delivery of voltage levels, the LSL 110 may also be coupled to the load 370 without going through the N-Stage predriver unit and the P-Stage driver unit.

Figure 4:
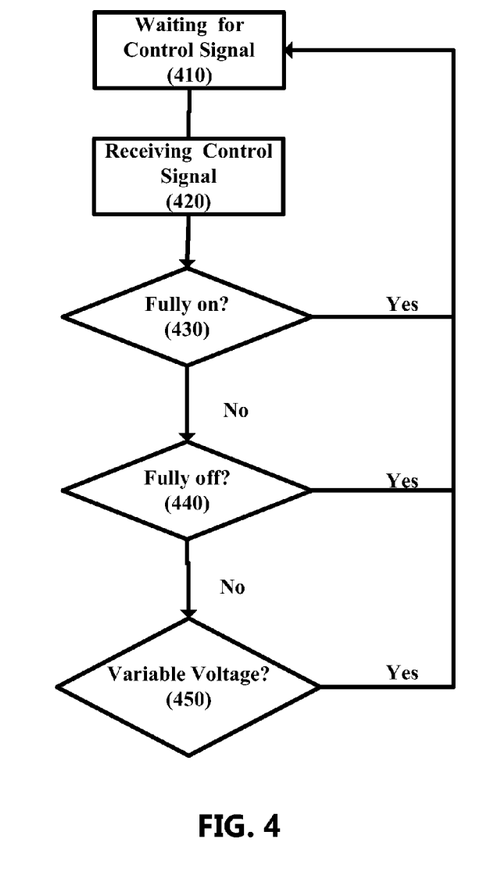
FIG. 4 is a flow diagram illustrating a portion of an example operation of the HS-LDO circuit in accordance with various embodiments.

FIG. 4 is a flow diagram illustrating a portion of an example operation of the HS-LDO circuit in accordance with various embodiments. In various embodiments, as illustrated, the HS-LDO circuit 100 may wait for a control signal in block 410. The control signal may or may not be the VID signal from the processor. The HS-LDO circuit 100 may receive the control signal in block 420. The control signal may indicate to the HS-LDO circuit 100 that the PGT units 150 associated with the HS-LDO circuit 100 should operate in fully on or fully off mode, as indicated in blocks 430 and 440. In these two operating modes, an additional selection logic, not shown, may disable the HS-LDO circuit 100 to allow the PGT units 150 to be operating in switched modes, functioning as on/off switches to the load 170 associated with the PGT units 150. Alternatively, the control signal may indicate to the HS-LDO circuit 100 that the PGT units 150 associated with the HS-LDO circuit 100 should operate in variable voltage mode as indicated in block 450. In this mode, the additional selection logic may enable the HS-LDO circuit 100, thereby causing the PGT units 150 to output a voltage that is specified by the control signal. In various embodiments, once the control signal has been processed, the HS-LDO circuit 100 may continue waiting for the next control signal in block 410.

In various embodiments, the selection logic may turn on/off all the PGT units 150 within a power domain sequentially in a daisy-chain manner in blocks 430, 440 and 450. This may soften the slope of the current required by the load 170 as it is turned on/off, and prevent glitches in the supply voltage when thousands of the PGT units 150 within a power domain are being turned on/off simultaneously.

Figure 5:
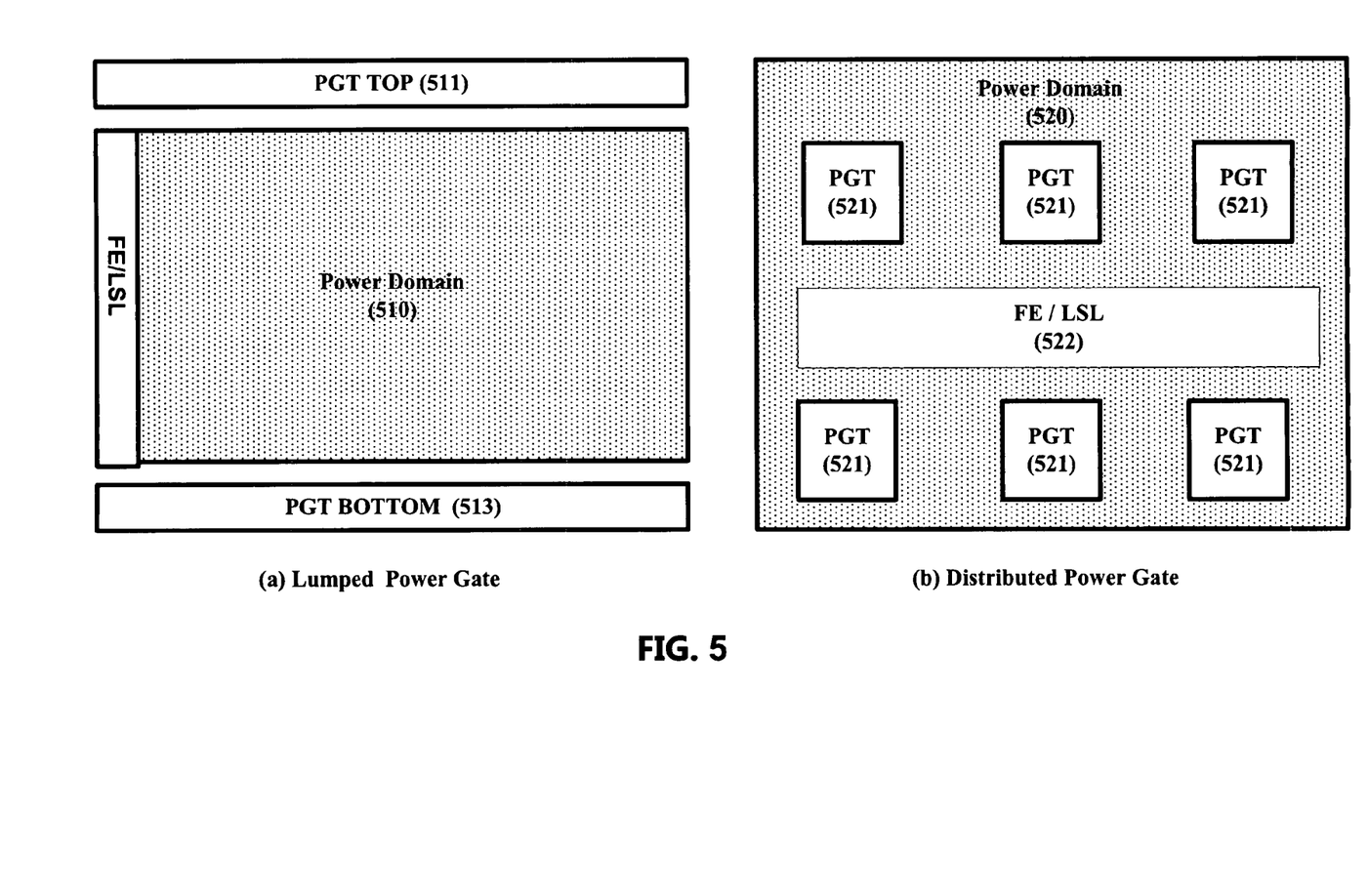
FIG. 5 is a block diagram illustrating two ways of integrating a HS-LDO circuit into a power domain of a processor in accordance with various embodiments.

FIG. 5 is a block diagram illustrating two ways of integrating a HS-LDO circuit into a power domain of a processor in accordance with various embodiments. In the lumped power gate method, as illustrated in FIG. 5(a), the PGT units may be placed within the bump pitch located on a PGT top layer 511 and a PGT bottom layer 513 of the power domain 510. Standard power gate units may typically be much smaller than the bump pitch. Therefore, the HS-LDO circuit components may be added to the bump pitch by utilizing the free areas within the bump pitch.

In the distributed power gate method, as illustrated in FIG. 5(b), multiple PGT units 521 may be disbursed throughout the power domain 520. Standard PGT units, as those provided by the EDA vendors, may have a low fill factor, making it possible to insert various components of the HS-LDO circuit components into the PGT units 521, for example, the selection logic used to enable/disable the PGT units 521 as previously illustrated. In addition, a front-end 522 containing the LSL 110 and other components of the HS-LDO circuit may also be added to the power domain 520 to be shared by all the PGT units 521. In various embodiments, the process of adding the HS-LDO circuit to the PGT units may be assisted by the APR process. In various embodiments, the extra space that is needed to implement the HS-LDO circuit in either the lump sum method or the distributed method may be negligible. In various embodiments, the HS-LDO circuit may increase the chip area by less than 3%.

Figure 6:
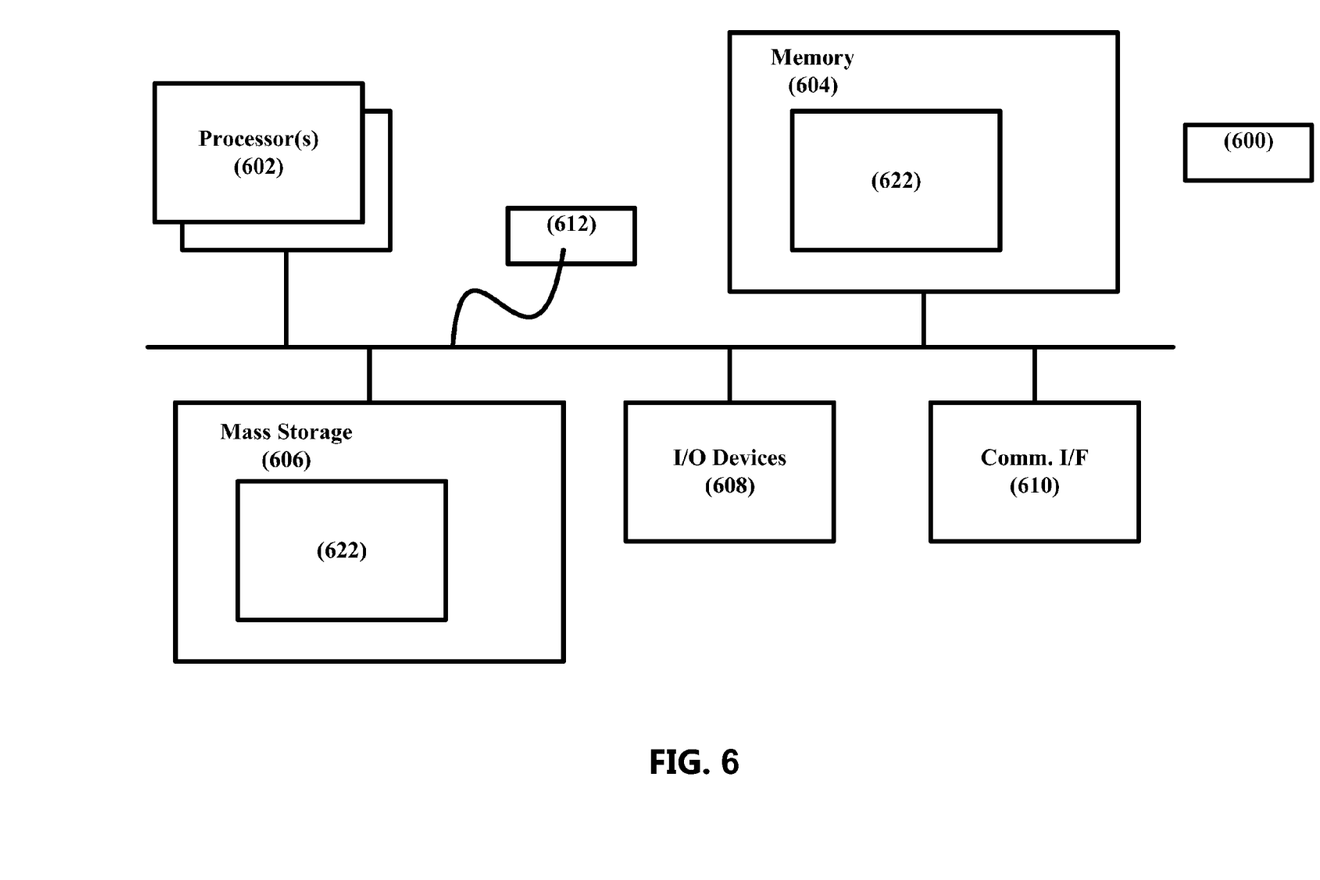
FIG. 6 is a block diagram illustrating an example computer system suitable for use to practice various embodiments of the present invention.

FIG. 6 illustrates an example computer system suitable for use to practice various embodiments of the present invention. As shown, computing system 600 may include a number of processors or processor cores 602, and system memory 604. For the purpose of this application, including the claims, the terms "processor" and "processor cores" may be considered synonymous, unless the context clearly requires otherwise. The processors 602 (or other elements of computing system 600) may contain one or more power domains, one or more HS-LDO circuits and one or more PGT units as previously illustrated.

Additionally, computing system 600 may include mass storage devices 606 (such as diskette, hard drive, compact disc read only memory (CDROM) and so forth), input/output devices 608 (such as keyboard, cursor control and so forth) and communication interfaces 610 (such as network interface cards, modems and so forth). The elements may be coupled to each other via system bus 612, which represents one or more buses. In the case of multiple buses, they are bridged by one or more bus bridges (not shown).

Each of these elements may perform its conventional functions known in the art. In particular, system memory 604 and mass storage 606 may be employed to store a working copy and a permanent copy of the programming instructions implementing one or more operating systems, drivers, applications, and so forth, herein collectively denoted as 622.

The permanent copy of the programming instructions may be placed into permanent storage 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The remaining constitution of these elements 602-612 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. An apparatus, comprising:
   a processor chip having multiple power domains that are each to be supplied by a low dropout (LDO) voltage regulator circuit,
   wherein each LDO voltage regulator circuit includes:
   (i) at least one power gate transistor to provide different supply modes including a switched-on mode, a switched-off mode, and a variable voltage output mode, and
   (ii) voltage regulation control circuitry to be enabled during the variable voltage mode and disabled during the switched-on and switched-off modes.

2. The apparatus of claim 1, wherein the voltage regulation control circuitry comprises at least one analog control loop to regulate output voltage from the at least one power gate transistor during the variable voltage mode, the analog control loop to be disabled during the switched-on and switched-off modes.

3. The apparatus of claim 1, further comprising:
   selection logic for each LDO voltage regulation circuit to disable the voltage regulator control circuitry for the switched-on and switched-off modes.

4. The apparatus of claim 1, wherein the voltage regulation circuitry for each LDO voltage regulation circuit further comprises: (i) an operational amplifier (op-amp) having a first input terminal configured to receive a reference voltage, a second input terminal coupled with an output terminal of the op-amp to form a feedback loop; (ii) a predriver unit coupled to the output terminal of the op-amp; and (iii) a driver unit, wherein the predriver unit is coupled to the driver unit, which is coupled to the at least one power gate transistor to cause it to produce an output voltage based on the reference voltage during the variable voltage mode.

5. The apparatus of claim 4, wherein the op-amp comprises an operational transconductance amplifier.

6. The apparatus of claim 4, wherein the op-amp is configured to receive the reference voltage from a bandgap reference voltage generator configured to generate the reference voltage based on a voltage identification (VID) signal.

7. The apparatus of claim 4, wherein the predriver unit includes an N-type transistor and wherein the driver unit includes a P-type transistor.

8. The apparatus of claim 4, wherein the predriver unit and the driver unit further comprise one or more biasing resistors.

9. The apparatus of claim 4, further comprising:
a filter coupled in between the predriver and the driver unit.

10. A computing system, comprising:
a processor chip;
an external voltage supply to provide power to the processor chip; and
I/O devices coupled to the processor chip to provide a user with access to the computing system, the processor chip having two or more logic blocks with separate power domains, wherein each power domain is powered from an associated at least one power gate unit having a supply input coupled to the external voltage supply, a control input, and a supply output to provide an internal voltage supply to a respective power domain;
wherein each power domain has a low dropout (LDO) control circuit coupled to the control input of its associated at least one power gate unit and selection logic, the LDO control circuit to control the at least one power gate unit to provide a variable voltage output in a variable voltage output mode, the selection logic to disable the LDO control circuit to save power for a switch mode where the at least one power gate transistor is to be either (i) switched on to couple the external voltage supply to the internal voltage supply for an on mode, or (ii) switched off to de-couple the external voltage supply from the internal voltage supply for an off mode.

11. The computing system of claim 10, wherein the LDO control circuit includes a low speed loop circuit and a high speed loop circuit.

12. The computing system of claim 10, wherein the at least one power gate unit comprises a P-type transistor device.

13. The computing system of claim 10, wherein each power domain includes multiple power gate units controlled from a common LDO control circuit.

14. The computing system of claim 10, wherein the selection logic turns on/off power gate units within a power domain sequentially in a daisy-chain manner.

* * * * *